United States Patent [19]

Butler et al.

[11] Patent Number: 4,661,969
[45] Date of Patent: Apr. 28, 1987

[54] COMMUNICATION LINES WITH TERMINATE AND LEAVE CAPABILITY-VF DATA BRIDGE

[75] Inventors: Myron C. Butler, Edmond, Okla.; Lawrence O. Hilligoss, Seal Beach; William R. Hilligoss, Long Beach, both of Calif.

[73] Assignee: Communications Technology Corporation, Los Angeles, Calif.

[21] Appl. No.: 730,082

[22] Filed: May 3, 1985

[51] Int. Cl.[4] .............................................. H04M 1/24
[52] U.S. Cl. ......................................... 379/1; 379/27; 379/158; 379/203
[58] Field of Search ................ 179/175.2 R, 175.3 R, 179/175.3 F, 175, 18 BC

[56] References Cited

U.S. PATENT DOCUMENTS

4,338,496  7/1982  Yakel ............................ 179/175.1 R
4,536,617  8/1985  Perry ........................ 179/175.3 R X Primary Examiner—Stafford D. Schreyer
Attorney, Agent, or Firm—Harris, Kern, Wallen & Tinsley

[57] ABSTRACT

Apparatus for interconnecting a plurality of communication line pairs, typically voice frequency lines of the telephone type. A passive resistance bridge with pairs of bridge terminals and switches for connecting bridge terminal pairs to communication line pairs or to terminating resistors. Local and remote control for the switches and control apparatus which permits service personnel to selectively terminate a bridge terminal pair with a fixed resistor and leave a subscriber's communication line open, for maintaining service for other communication lines connected to the bridge while performing maintenance on the disconnected line. The apparatus is suitable for two wire and for four wire systems and for resistance bridges with various numbers of terminals, such as six way, eight way and twelve way.

10 Claims, 11 Drawing Figures

FIG. 3.
POWER SUPPLY BOARD - PSB

FIG. 5.
CENTRAL PROCESSING UNIT BOARD – CPU

* CONTROL CONSISTS OF THE FOLLOWING SIGNALS: I/O*, MEM*, RD*, MI*, RFSH*, RESET*, PWRS*, AND CLK

FIG. 6. VOICE FREQUENCY/DATA BRIDGE BOARD VFB

Fig. 7.
Firmware Flow Chart — Main

Fig. 8.
FIRMWARE FLOW CHART
DIAL-BACK SECURITY

Fig. 10. FIRMWARE FLOW CHART *3

FIG. 11.
FIRMWARE FLOW CHART #5

PHONE BOOK MAINTENANCE [4]

COMMUNICATION LINES WITH TERMINATE AND LEAVE CAPABILITY-VF DATA BRIDGE

BACKGROUND OF THE INVENTION

This invention relates to telephone systems and in particular, to resistance bridges used for interconnecting a plurality of subscribers' lines for conference purposes, data interchange, and the like.

Figure 1:
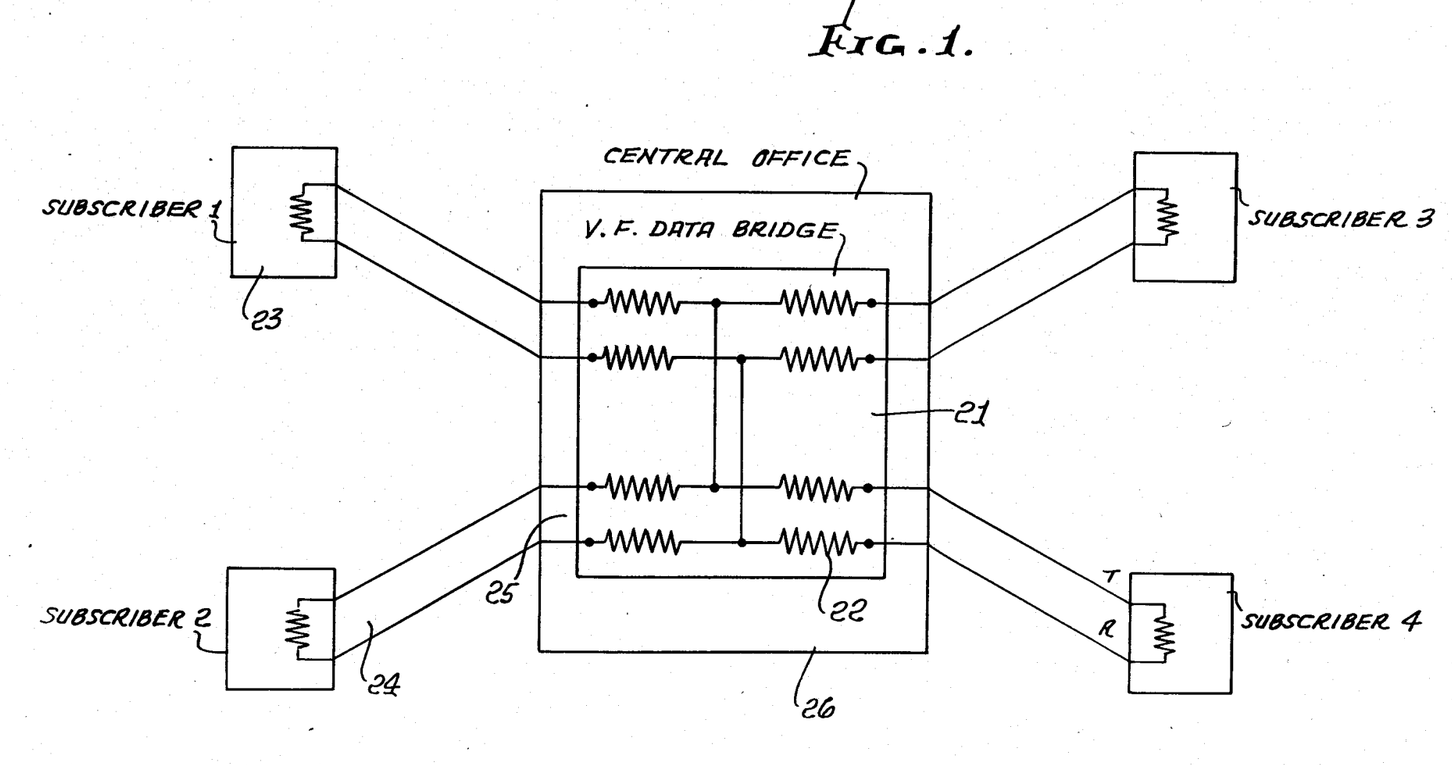
FIG. 1 is an electrical schematic illustrating a conventional four-way, two-wire resistance bridge.

A resistance bridge typically comprises a plurality of interconnected resistors and a plurality of terminal pairs for connection to subscribers' lines. The bridges may be two-wire or four-wire and may provide for handling various numbers of subscribers' lines, typically three-line or three-way to twentyfour-line or twentyfour-way. The specific embodiment described herein is for a two-wire system, but the invention is equally applicable to a fourwire system. A four way bridge is shown in FIG. 1. The apparatus shown in FIG. 2 includes four bridge boards, each of which can handle 24 two wire circuits thereby providing for 4 two wire six-way bridges, or 3 two wire eight-way bridges, or 2 two wire twelve-way bridges. The bridges can be constructed with different losses as desired by the telephone company.

Early embodiments of resistance bridges utilized separate resistors mounted on a circuit board, while more modern installations utilize printed circuitry. The resistive bridge is arranged to provide equal input and output impedances, usually 600 ohms, and large numbers of such impedance bridges are found in telephone equipment offices.

The resistance bridges are utilized for voice conferences and data interchange and typically operate at voice frequency (VF) in the range of 200 hertz to 23.5 kilohertz, as well as with a variety of communication lines including plain old telephone service (POTS).

From time to time problems arise in service utilizing resistance bridges and the telephone maintenance personnel must locate, identify and repair or replace the component or components causing the problem. Trouble shooting is accomplished by systematically disconnecting a subscribers line from a resistance bridge and substituting a terminating resistor for the subscriber's line. If the trouble is no longer present after this substitution has been made, the maintenance person knows that the problem is in the subscriber's line. Then the line can be tested and repaired. If the trouble is still present after a substitution, the substitution is reversed, that is, the terminating resistor is removed and the subscriber's line is reconnected, and the process is repeated for another subscriber's line. This is a difficult and time consuming approach which requires a maintenance person to work at the resistance bridge or at terminals leading to the bridge, which usually are found in crowded conditions of difficult access.

The problem of maintenance of resistance bridges is discussed in considerable detail in U.S. Pat. No. 4,338,496 which also presents a proposed solution. In the system of that patent, a two terminal jack is provided for each pair of bridge terminals and for each communication line pair, with appropriate interconnections between the jacks. The bridge and line interconnections are changed by manual insertion of appropriate plugs in the jacks. While the system of this patent does eliminate the necessity for unsoldering and resoldering of connections, it still requires the service personnel to be present at the bridge being tested and to manually effect the disconnection of communication lines and connection at terminating resistors.

It is an object of the present invention to provide a new and improved apparatus for use in testing resistance bridges. A particular object is to provide such apparatus which permits disconnecting and reconnecting of subscribers' lines and connecting and disconnecting of terminating resistors by service personnel at a location remote from the resistance bridge, and without requiring any physical movement of communication lines and/or terminating resistors. An additional object is to provide for such remote operation over existing equipment, such as a dual tone multi-frequency telephone hand set (DTMF) and a POTS lines.

It is an object of the invention to provide apparatus for testing resistance bridges which provides for disconnecting and reconnecting of individual lines very quickly and with a minimum of effort, thereby decreasing service requirement time and line down time. An additional object is to provide such apparatus which can be utilized with various types of communication lines, including VF and data, and two-wire and four-wire and various sizes of resistance bridges.

Other objects, advantages, features and results will more fully appear in the course of the following description, wherein the drawings merely show and the description merely describes the preferred embodiments of the present invention which are given by way of illustration of example.

SUMMARY OF THE INVENTION

An apparatus for interconnecting a plurality of communication line pairs including a resistance bridge having a plurality of pairs of bridge terminals, typically a VF or data bridge of the telephone type, one or more terminating resistors, one or more switches for connecting bridge terminals to communication line pairs and to terminating resistors, and a control means for actuating the switch means from a remote location to selectively connect a bridge terminal pair to a communication line pair and to a terminating resistor. An apparatus for accomplishing such interconnections in sequence with a plurality of communication lines and terminating resistors thereby providing for trouble shooting an entire resistance bridge of any size.

An interconnection apparatus as described which provides for both remote actuation on a conventional telephone line and for local manual actuation. An apparatus as described which provides for sensing and storing the state of each switch in the apparatus and for transmitting the state information to the remote location of the service personnel, including transmitting of information in audible speech.

DESCRIPTION OF THE PREFERRED EMBODIMENT

The resistance bridge 21 of FIG. 1 is a two-wire, four-way VF data bridge having eight resistances 22 interconnected as shown, and having four subscribers' telephones 23 or other equipment, each connected via a communication line pair 24 to a bridge terminal pair 25. Each of the communication line pairs 24 and the subscriber's units 23 connected thereto presents an electrical impedance to the bridge terminal pair 25, usually selected to be 600 ohms.

In normal operation, the switching equipment of the central office 26 will function to connect various subscribers to various bridge terminals, depending upon the communication links desired. When there is trouble in the system, maintenance personnel must identify and isolate the component causing the trouble. One aspect of the trouble shooting procedure is to disconnect a communication line from the resistance bridge terminal pair and substitute a fixed resistor at the terminal pair. This maintains the appropriate bridge balance, while permitting the service personnel to determine if the trouble is due to the disconnected communication line or to the remainder of the system. This operation is sometimes referred to as a terminate and leave capability (TLC). The apparatus of the present invention provides TLC without requiring direct access to the resistance bridge.

Figure 2:
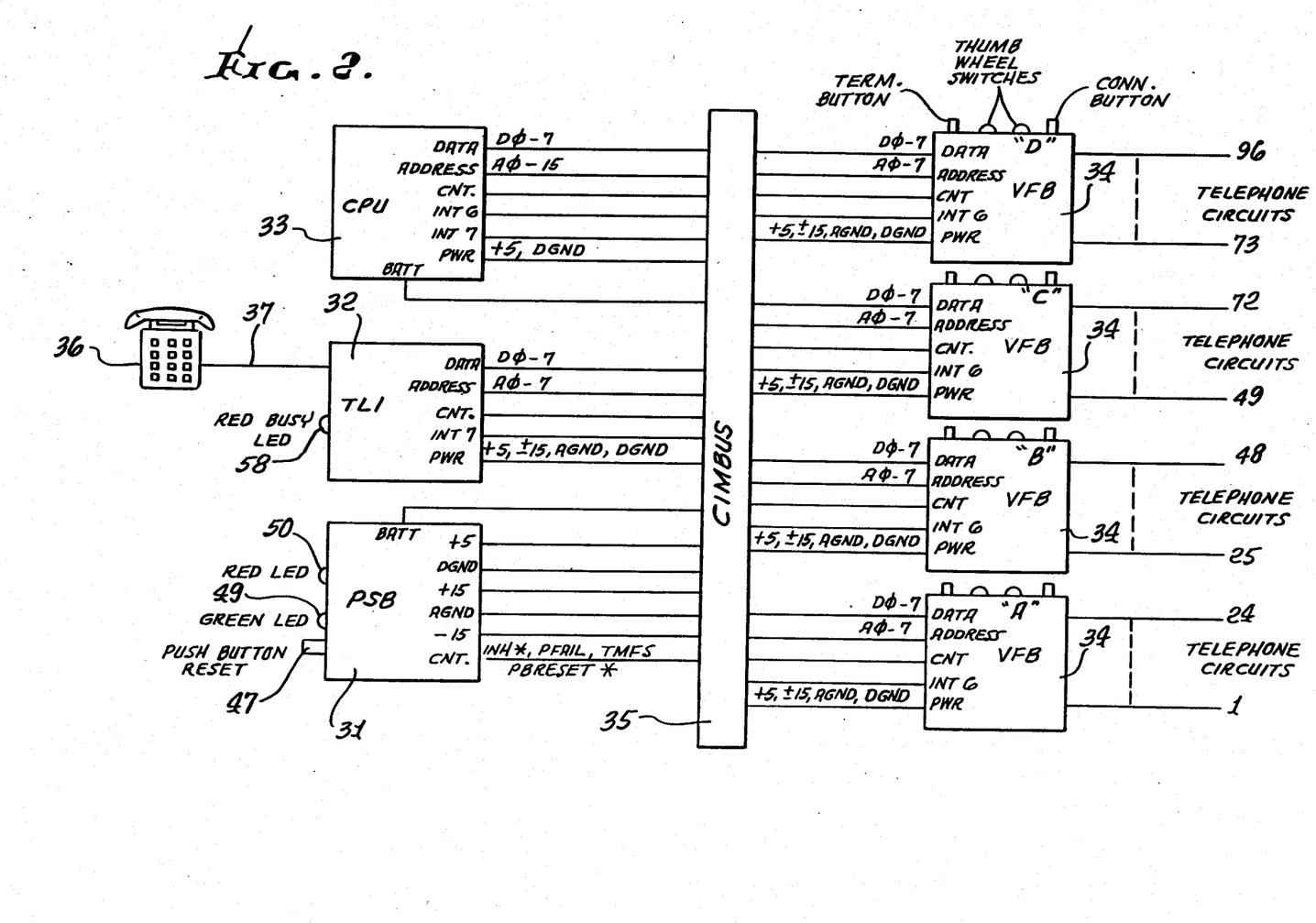
FIG. 2 is an electrical block diagram of apparatus for interconnecting communication lines, terminating resistors and resistance bridges, and incorporating the presently preferred embodiment of the invention.

The apparatus of FIG. 2 is sometimes referred to as a Special Services Control Unit (SSCU), and incorporates remote and local controlled terminate and leave capabilities with passive (resistive) voice frequency/data circuit bridges. The SSCU can replace a selected faulty circuit on a bridge with a 600 ohm resistor thus restoring the integrity of the bridge until the circuit can be repaired. Once the circuit is repaired it can be reconnected to the bridge and the 600 ohm resistor removed. The SSCU can be instructed to perform these functions from a remote dual-tone multi-frequency (DTMF) telephone via an ordinary two-wire telephone circuit or from local front panel controls.

Each SSCU of the embodiment disclosed can support up to 96 two-wire circuits. The SSCU includes a DC/DC power supply board (PSB) 31, a telephone line interface board (TLI) 32, a central processing unit board (CPU) 33, and four voice frequency/data bridge boards (VFB) 34, each handling 24 two-wire telephone circuits. All the boards within the SSCU are interconnected via a CMOS Industrial Microcomputer Bus (CIMBUS) 35. A standard DTMF telephone 36 is connected to the TLI 32 via a line 37.

The Power Supply Board—PSB

Figure 3:
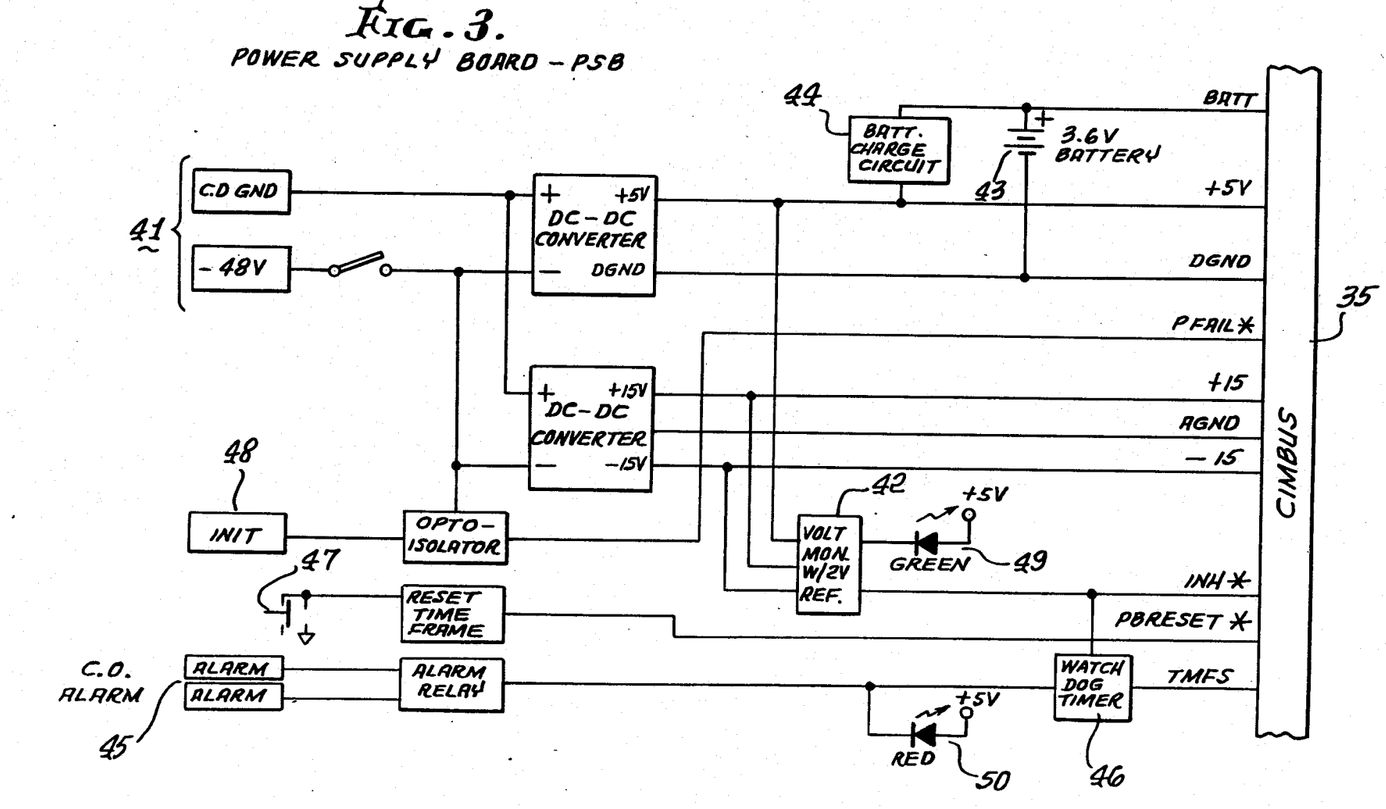
FIG. 3 is a diagram of the power supply board (PSB) of FIG. 2.

The SSCU Power Supply Board 31 is shown in greater detail in FIG. 3. The PSB meets all CIMBUS specifications and also: converts −48 VDC into +5 VDC and +/−15 VDC; provides battery back-up; monitors on-board voltage levels; and interfaces directly to the CIMBUS 35.

The PSB converts the standard central office −48 VDC supply at terminals 41 into +5 VDC and +/15 VDC to provide power for the CIMBUS. All three voltages are monitored by an on-board comparator 42. Green LED 49 remains on as long as all voltages are within tolerance. Should any of the voltages vary out of tolerance 49 would turn off and red LED 50 would turn on indicating a power failure. In the event of a power failure, all boards utilizing the CIMBUS INH* line are signaled. An on-board 3.6 VDC ni-cad battery 43 with recharge circuit 44 provides back-up for volatile RAM and other peripherals. The PSB incorporates an alarm output at terminals 45 (normally open, dry circuit) for central office use. The alarm is operated by a system watch-dog timer 46 and the voltage comparator 42. If the watch-dog timer is not reset every 500 ms by the RTC on the CPU, the alarm circuit will close, red LED 50 will turn on, and INH will become active. The push button 47, when depressed, provides a system reset signal to the CPU. The INIT terminal 48 is used to indicate to the CPU that the SSCU is being powered up for the first time. When 48 is grounded certain user programming features are made available. These features are detailed in the SSCU firmware flow diagram.

The Telephone Line Interface Board—TLI

The SSCU Telephone Line Interface Board 32 (FIG. 4) provides a complete communications link between the CIMBUS 35 and any 2-wire Voice Frequency (VF) data grade circuit 37 (POTS line). The TLI meets all the specifications of a CIMBUS slave board and also: interfaces directly to any POTS line via an on-board 2-wire/4-wire hybrid circuit 51; detects dial tone, ring and other various POTS line signals in the conventional manner; encodes 52 and decodes 53 DTMF; emulates speech (human voice) with variable vocabulary at a speech synthesizer 54; and interfaces directly to the CIMBUS.

Figure 4:
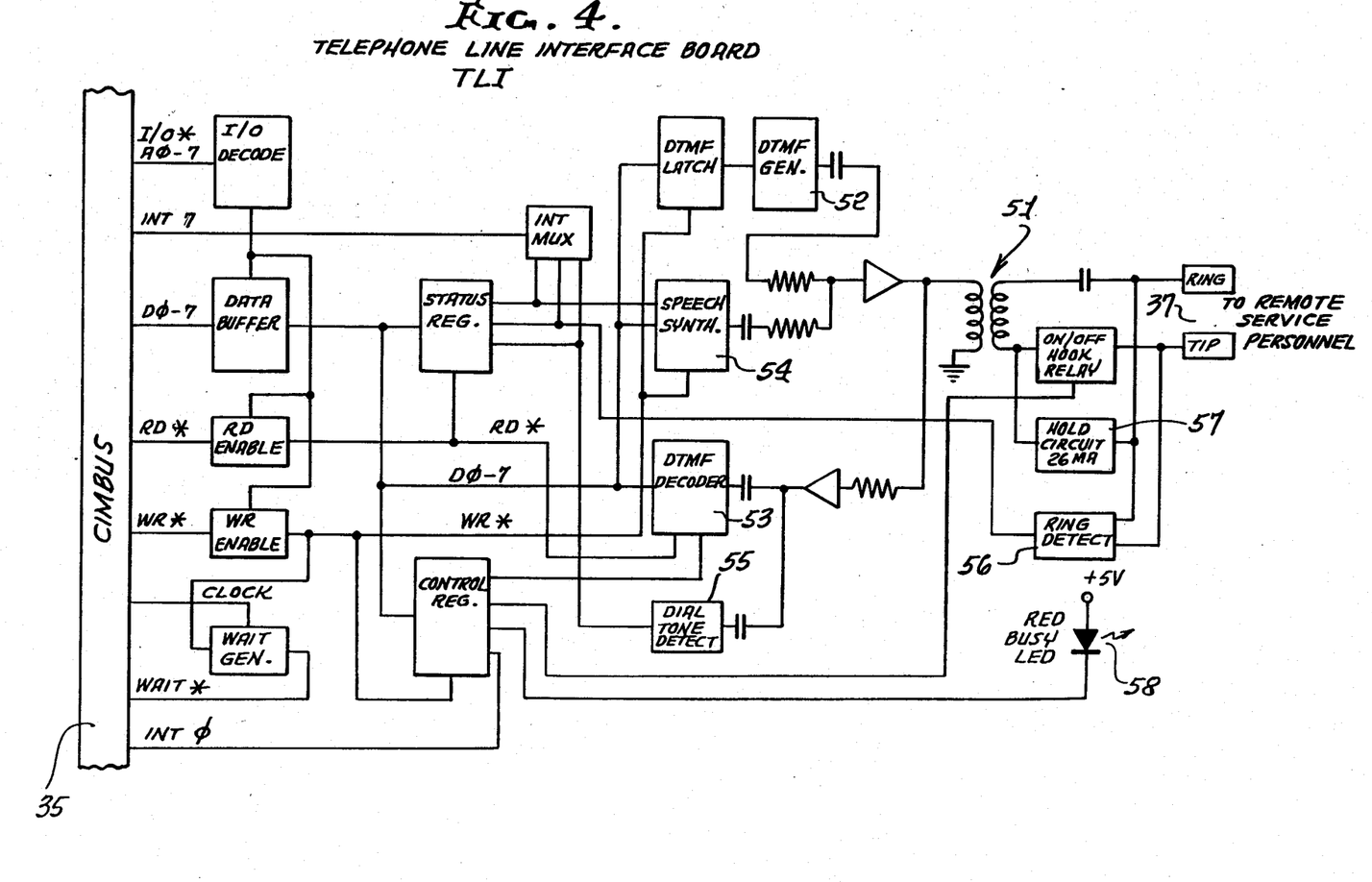
FIG. 4 is a diagram of the telephone line interface board (TLI) if FIG. 2.

The TLI allows the user to communicate with the SSCU via a single 2-wire VF data grade telephone circuit 37. Instructions can be sent to the unit via a DTMP keypad 36, and test results or current unit status can be received from the unit in the form of synthesized speech.

Figure 5:
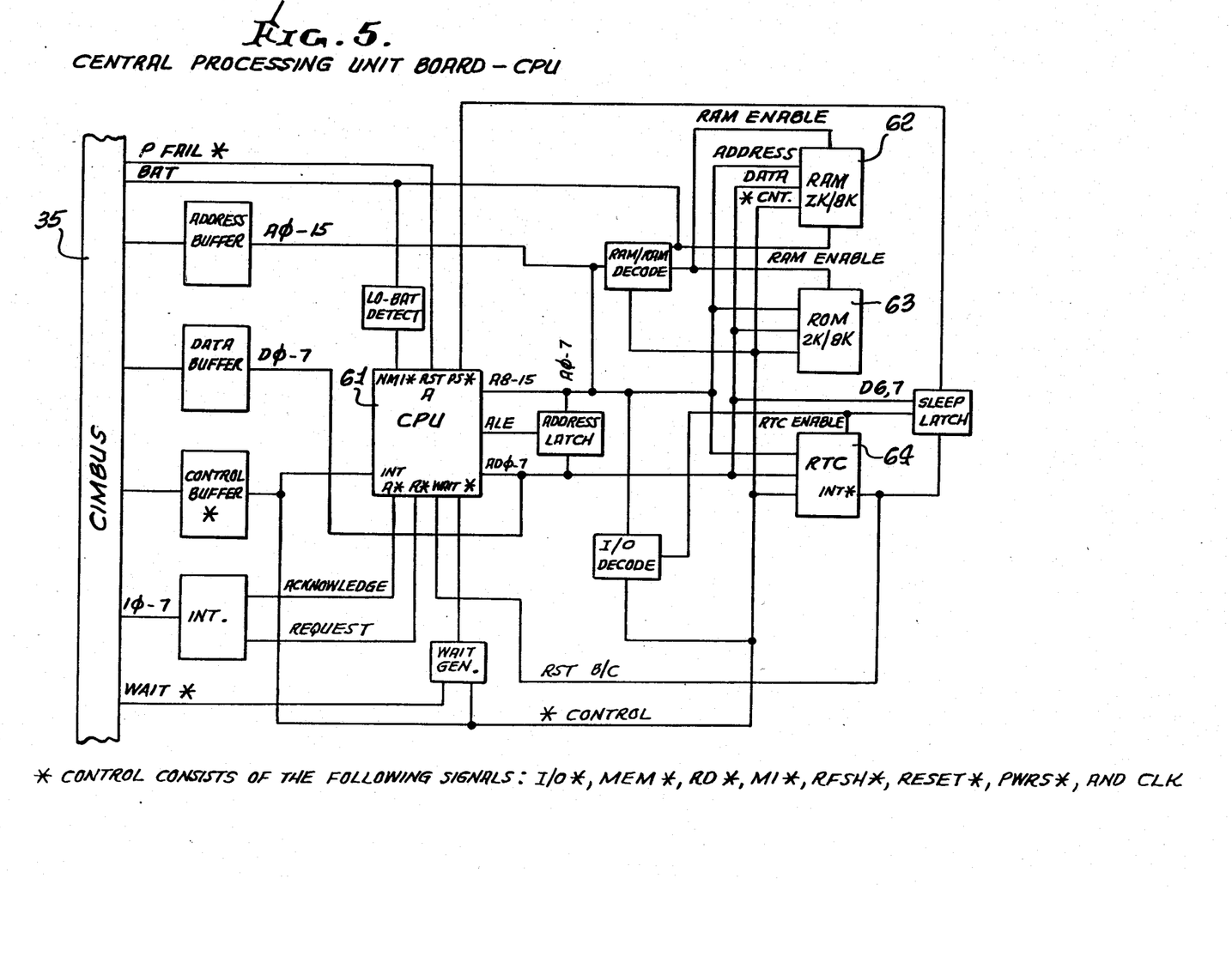
FIG. 5 is a diagram of the central processing unit board (CPU) of FIG. 2.

The TLI is capable of detecting a dial tone or ring at 55 or 56, seizing the telephone line via hold circuit 57, decoding or generating DTMF at 53 or 52, and outputting synthesized speech at 54. All these functions are controlled by the system processor (CPU) (FIG. 5) via the CIMBUS 35. Another LED 58 provides a busy line indication.

The Central Processing Unit Board—CPU

The SSCU Central Processing Unit Board (FIG. 5) provides a complete "stand alone" microcomputer utilizing the National Semiconductor NSC800 microprocessor 61 along with 2K of RAM 62 (random access memory), 8K of EPROM 63 (erasable/programmable read-only memory), real-time clock, and complete CIMBUS interface logic. The CPU is the control center providing all the necessary address, data, control and timing signals to the SSCU PSB, TLI and VFB. The CPU meets all the specifications of a CIMBUS master board and also: reads and performs all instructions contained in the firmware (8K of EPROM); and provides all system monitoring and control, i.e., sensing and sequencing the performance of all peripherals (PSB, TLI and VFB).

The CPU controls the SSCU according to the instructions contained in the firmware. From the moment power is applied, the CPU progresses through five states: initialization (set-up), idle (waiting for external instruction), remote telephone circuit termination/connection, local telephone circuit termination/connection, and self-test/report. Flow Charts for the firmware are set out in FIGS. 7-11.

The Voice Frequency/Data Bridge Boards—VFB

Figure 6:
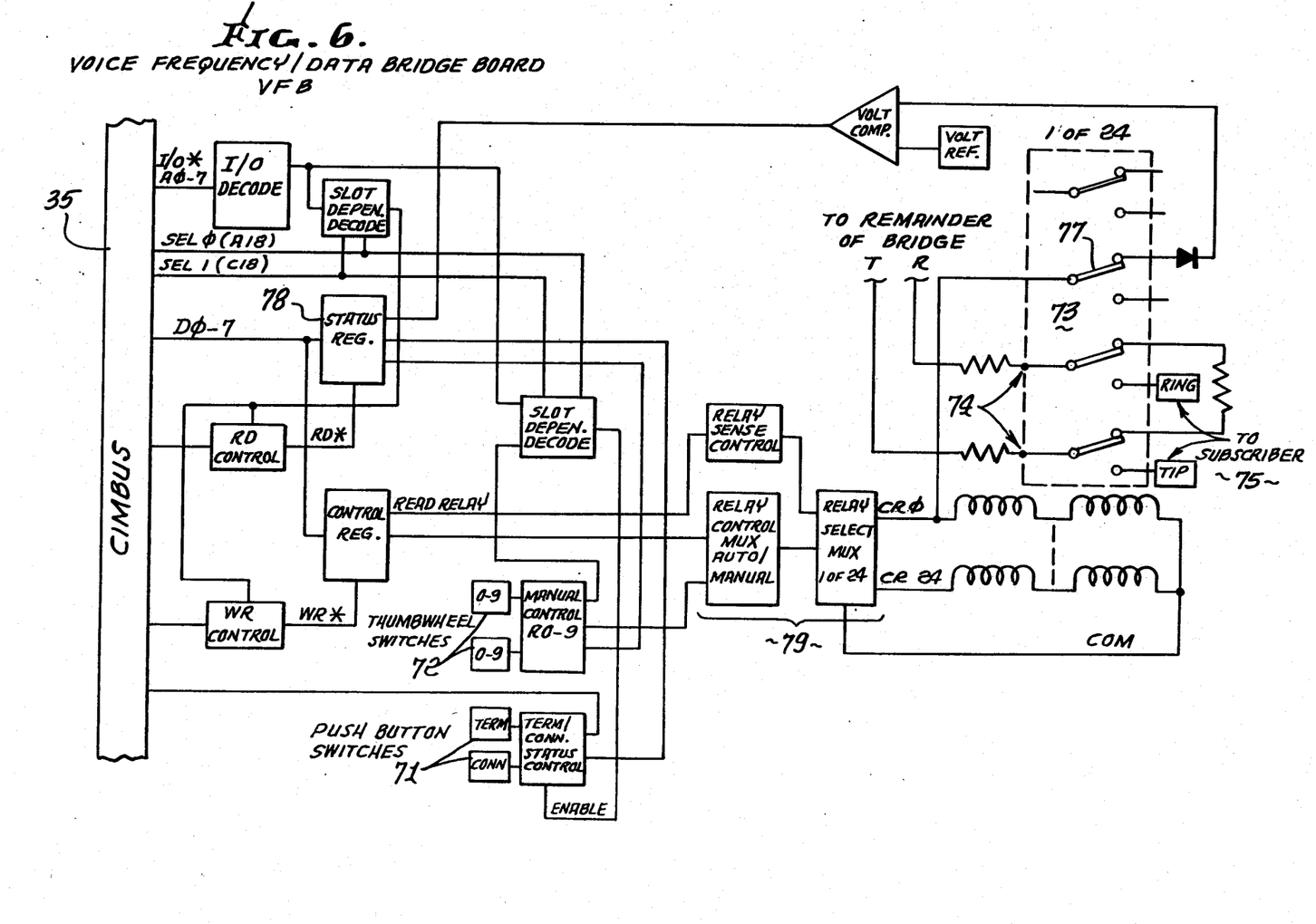
FIG. 6 is a diagram of one of the voice frequency/data bridge boards (VFB) of FIG. 2.

Each SSCU Voice Frequency/Data Bridge (VFB) board as shown in FIG. 6, meets all the signal specifications of a CIMBUS slave and also: provides both remote and manual isolation and termination of faulty multipoint VF data bridge circuits; and permits multiple bridge configurations: 2-wire/6, 8 and 12-way; and 4-wire/6 way.

The Voice Frequency Data Bridge board is the multipoint voice frequency (VF) data circuit interface for the SSCU. The purpose of the VFB is to permit both remote and local isolation and termination of faulty multipoint passive bridge networks during maintenance operations. Remote access is handled by the TLI and CPU boards. The TLI receives commands in the form of DTMF signals via a dedicated 2-wire VF circuit and passes them along to the CPU. The CPU executes the commands to the VFB. Local manual access is handled by on-board addressing and switching circuitry, typically push buttons 71 and thumb wheel switches 72, built into each VFB. This circuitry allows the VFB to be manually operated anytime, particularly in the event of a CPU failure.

Each VFB can be partitioned into one of several bridge configurations and impedance characteristics. The specific SSCU disclosed can utilize a minimum of one VFB board to access 24 VF data circuits and a maximum of four VFB boards which will handle 96 VF data circuits.

Switching is accomplished by twenty four relays 73. One is shown in FIG. 6 as a four pole, double throw switch, with two poles providing for connecting a bridge terminal pair 74 to a communication line pair 75 or to a terminating resistor 76.

The VFB is divided into five major areas: the CIMBUS Interface, the Relay Control (both remote and manual), the Relay State Sense Circuitry, the VF Data Circuit Interface, and the VF Data Bridge. The CIMBUS Interface provides the standard address, data, control and power interconnects which allows conformance and communication with other CIMBUS compatible devices. The Relay Control 79 handles all relay switching functions. The Relay State Sense Circuitry enables the SSCU to read the state (connected or terminated) of any relay via a contact set 77 of the relay 73, with the relay switch state stored in a register or memory 78. The VF Data Circuit Interface provides the physical interconnect between the VFB and the circuits it is servicing. The VF Data Bridge performs passive impedance matching of multiple VF data circuits while connecting them together at a common point.

The routines of the Special Services Control Unit (SSCU) firmware are set out below in conjunction with the flow chart of FIGS. 7-11. The routines that will be described are System Reset [1], Idle State [2], Unit Security [3], Phone Book Maintenance [4], Test/Warning Report [5], Remote Bridge Maintenance [6] and Local Bridge Maintenance [7].

System Reset [1]

Figure 7:
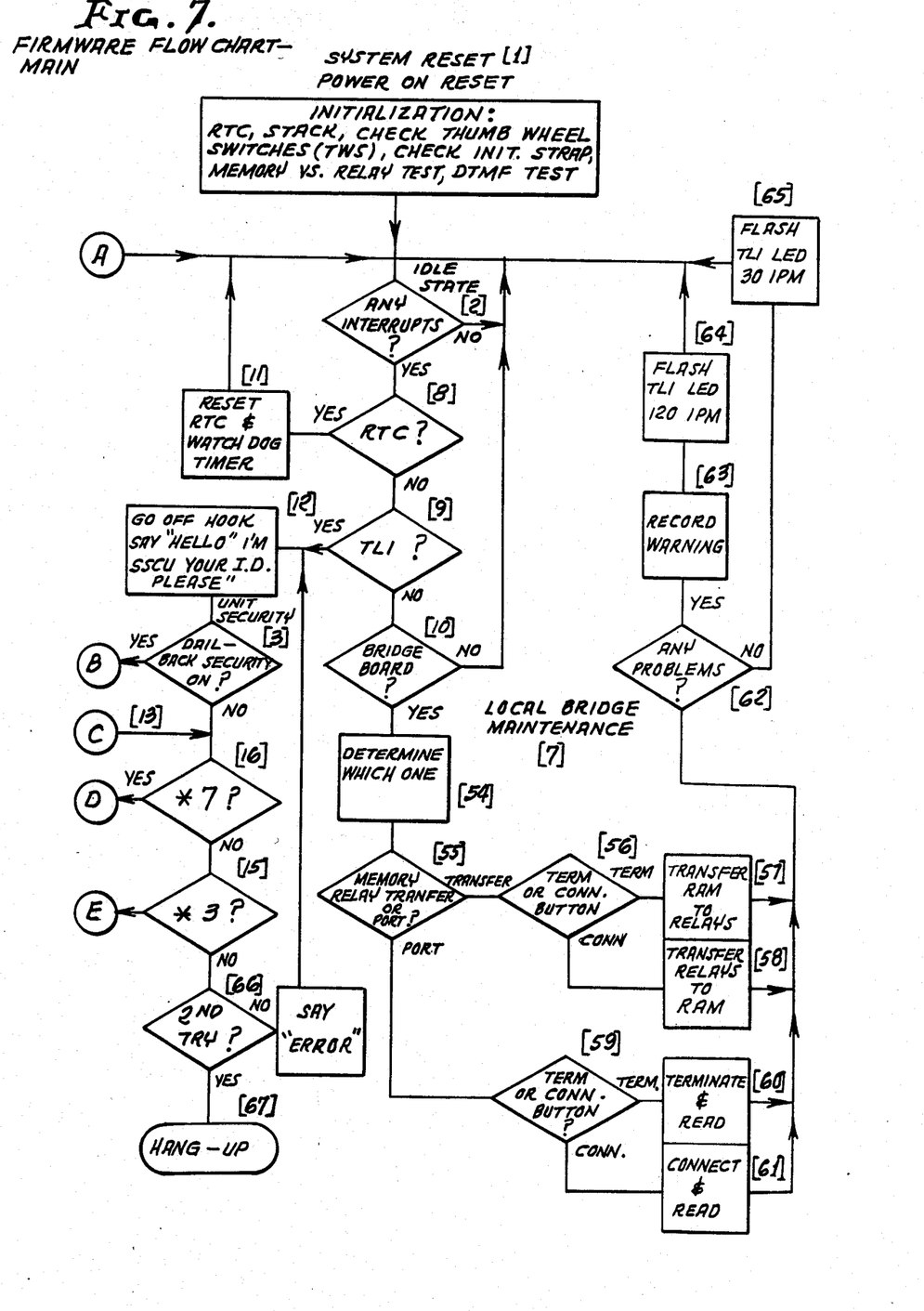
FIGS. 7-11 are a flow chart for the operation of the apparatus of FIGS. 2-6.

When the reset button on the power supply board is pushed or power is first applied to the SSCU, a system reset occurs. A system reset causes the SSCU central processing unit (CPU) to automatically perform several unit self-tests. These include testing the dual tone multifrequency (DTMF) generating and decoding circuitry and insuring that the random access memory (RAM) record of the state of the bridge relays corresponds with the actual state of the bridge relays.

The SSCU CPU also initializes the real-time clock. Lastly, the SSCU CPU determines the number of bridge boards currently in the system, the state of the bridge board thumb-wheel switches and whether the initialization strap is on the back of the unit. Once the System Reset process is concluded the SSCU proceeds to the Idle State routine.

Idle State [2]

In the Idle State, the SSCU CPU waits for one of three devices to request service: the real-time clock (RTC) [8], the telephone line interface board (TLI) [9] or one of the bridge boards [10].

During System Reset the RTC is programmed to request service at regular intervals. When the RTC requires service the SSCU CPU acknowledges the request and resets the watch-dog timer [11] on the power supply board. The SSCU CPU then returns to the Idle State routine. NOTE: Should the SSCU CPU ever fail to acknowledges service request from the RTC, the watch-dog timer would turn on the red LED on the power supply board indicating a processor failure.

The TLI is connected to a dedicated POTS line. The POTS line provides the means for communicating with the SSCU remotely. The TLI requests service whenever a "ring" is detected on the POTS line. The SSCU responds by going off-hook (answering the telephone) and saying "Hello, I'm SSCU. Your Identification, please" [12]. The SSCU CPU will then proceed to the Unit Security routine [3].

The bridge boards request service whenever either a terminate or connect button is pushed. The SSCU CPU will then proceed to the Local Bridge Maintenance routine [7].

Unit Security [3]

Figure 8:
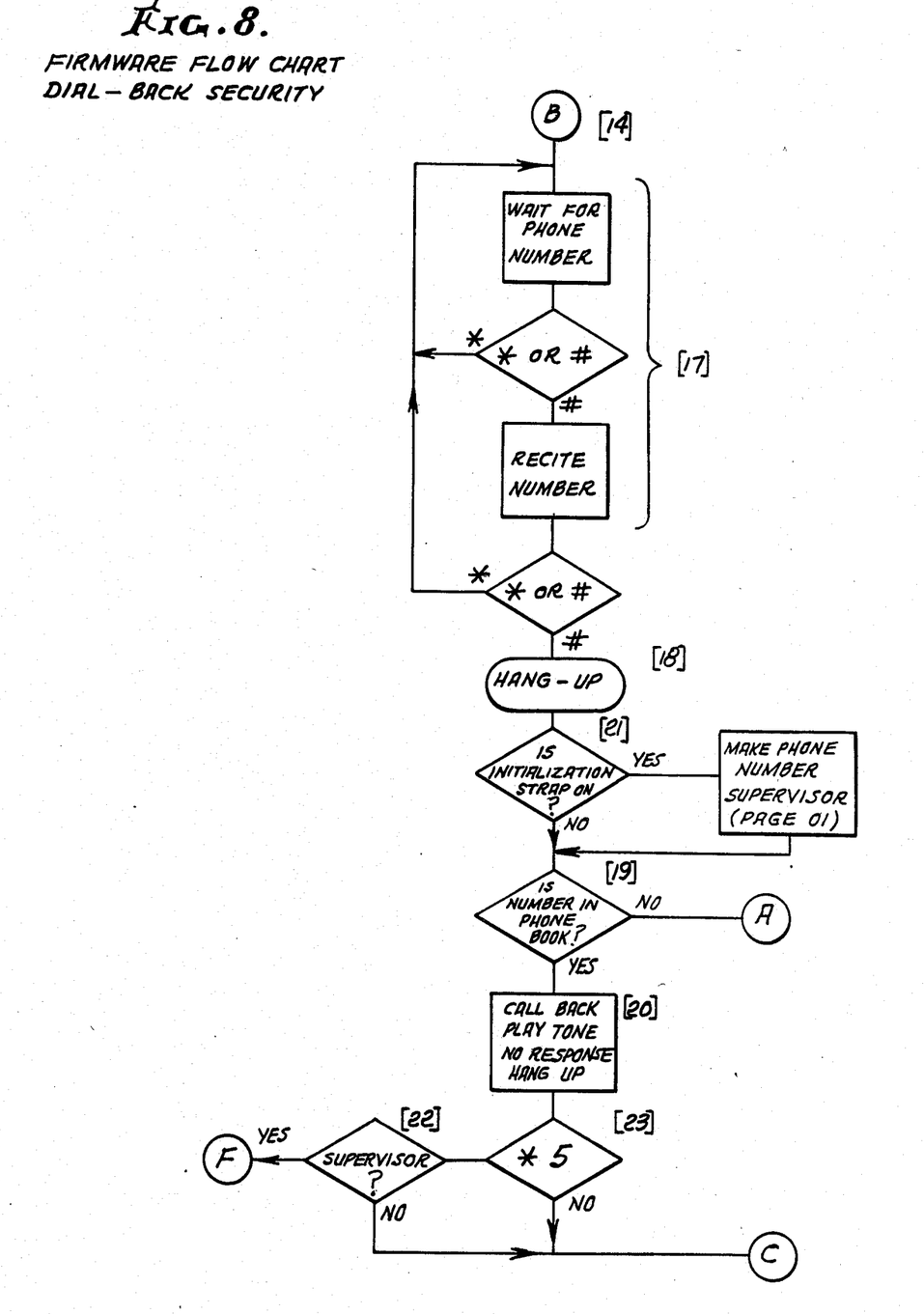
Figure 9:
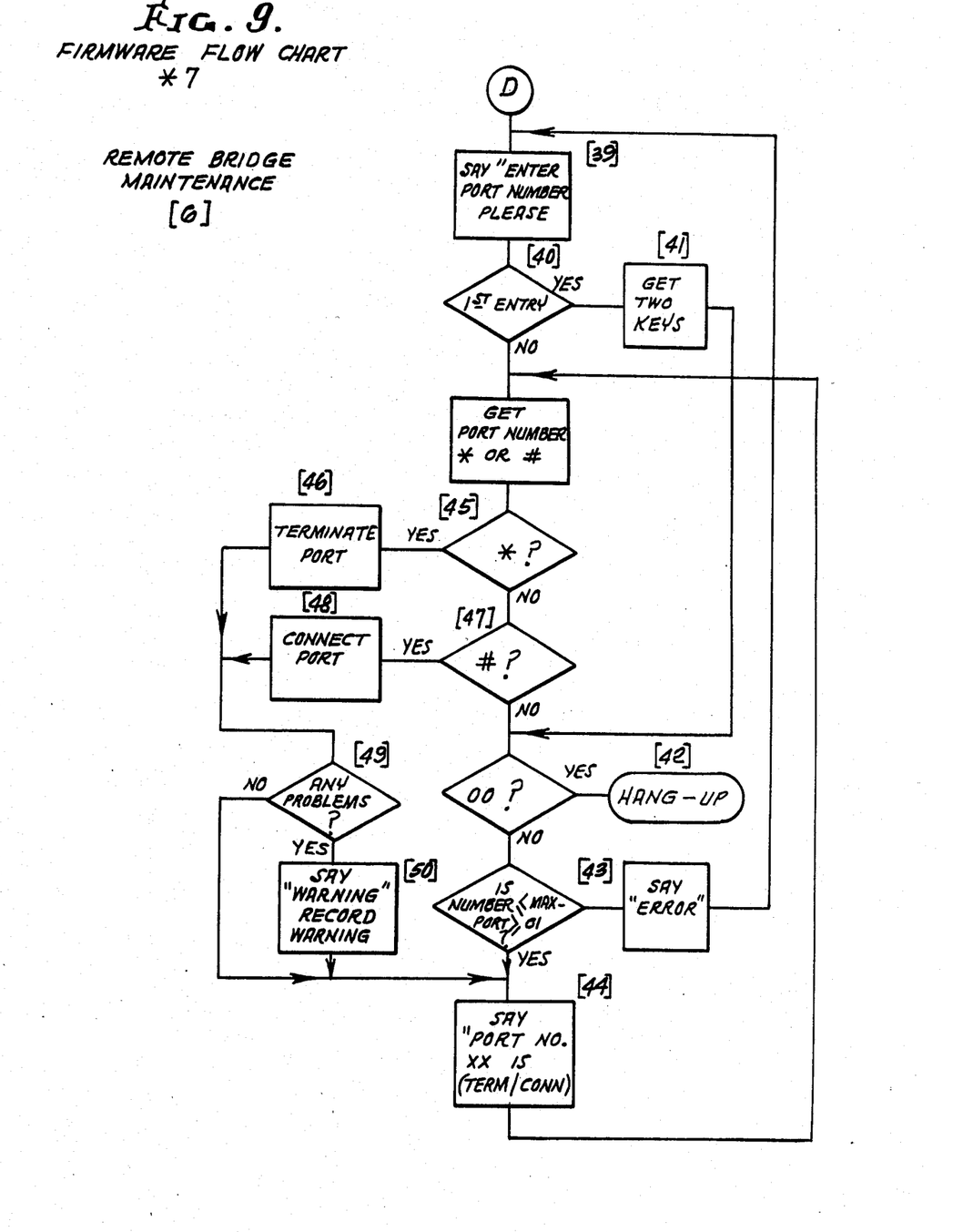

One of two difficulties of accessability can be selected for the SSCU: minimum security [13] or dial-back security [14]. In minimum security the SSCU CPU waits for either an *3 [15] which causes the SSCU CPU to go to the Test/Warning Report routine or an *7 [16] which causes the SSCU CPU to go to the Remote Bridge Maintenance routine.

In the dial-back security the SSCU CPU waits for the caller to enter his phone number [17] and hang up [18]. The SSCU CPU will compare the number with an internal "phone book" to see if it is a valid dial-back number [19]. If it is, the SSCU will call back [20]. When the caller answers, the SSCU CPU will play a tone indicating to the caller that he has direct access to *3 [15] and *7 [16], the same as minimum security [13]. Additionally, if the initialization strap is installed [21] or the caller is using the "supervisor" number [22] (the last number entered with the initialization strap on), the SSCU CPU will allow access to the Phone Book Maintenance routine (*5) [4]. If the SSCU CPU cannot find the caller's phone number [19] the SSCU will return to the Idle State [2] thus denying entry into the system.

If the SSCU is set for minimum security [13] and a caller should twice enter two digits other than *3 and *7 [66] the SSCU CPU will go on-hook (hang up) [67] and return to the Idle State [2].

Phone Book Maintenance [4]

Figure 11:
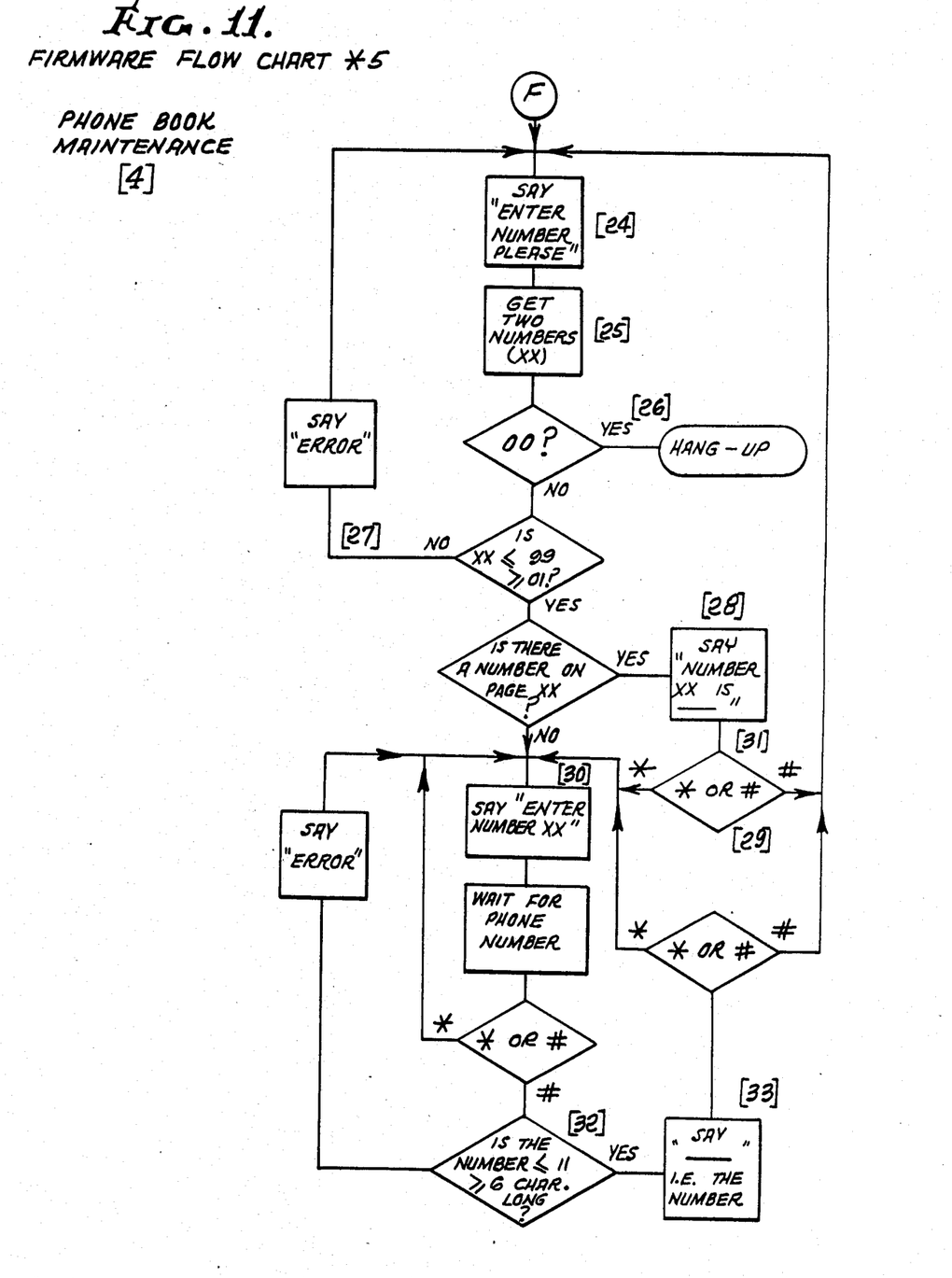

If an *5 [23] is received the SSCU CPU determines whether the called is the "supervisor" [22]. If he is not, the SSCU says "Error" and returns to minimum security [13].

If the caller is the "supervisor", the SSCU will ask the caller to "Enter number, please" referring to the page number in the SSCU "phone book" [24]. The SSCU CPU will wait for a two-digit page number from 01 to 99 [25]. If 00 is received the SSCU will go on-hook (hang up) [26] and return to the Idle State [2]. If more than two digits are entered the SSCU will say "Error, enter number, please" [27]. If the page number is between 01 and 99 and a phone number is already present on the page the SSCU will say "Number is xxx-xxx-xxxx" [28] and wait for an * or a # from the caller [29].

If an * is received the present phone number is cleared and the SSCU says "Enter number XX" [30] where XX is the current page number. If a # is received the phone number is retained unchanged and the SSCU goes back to the beginning of the routine [31].

The SSCU CPU will only accept phone numbers greater than/or equal to six digits and less than/or equal to 11 digits [32]. Newly entered phone numbers are recited back to the caller [33]. If the caller enters a # indicating the number is correct, the number is placed in the "phone book". If an * is received the SSCU CPU returns to [30].

Test/Warning Report [5]

Figure 10:
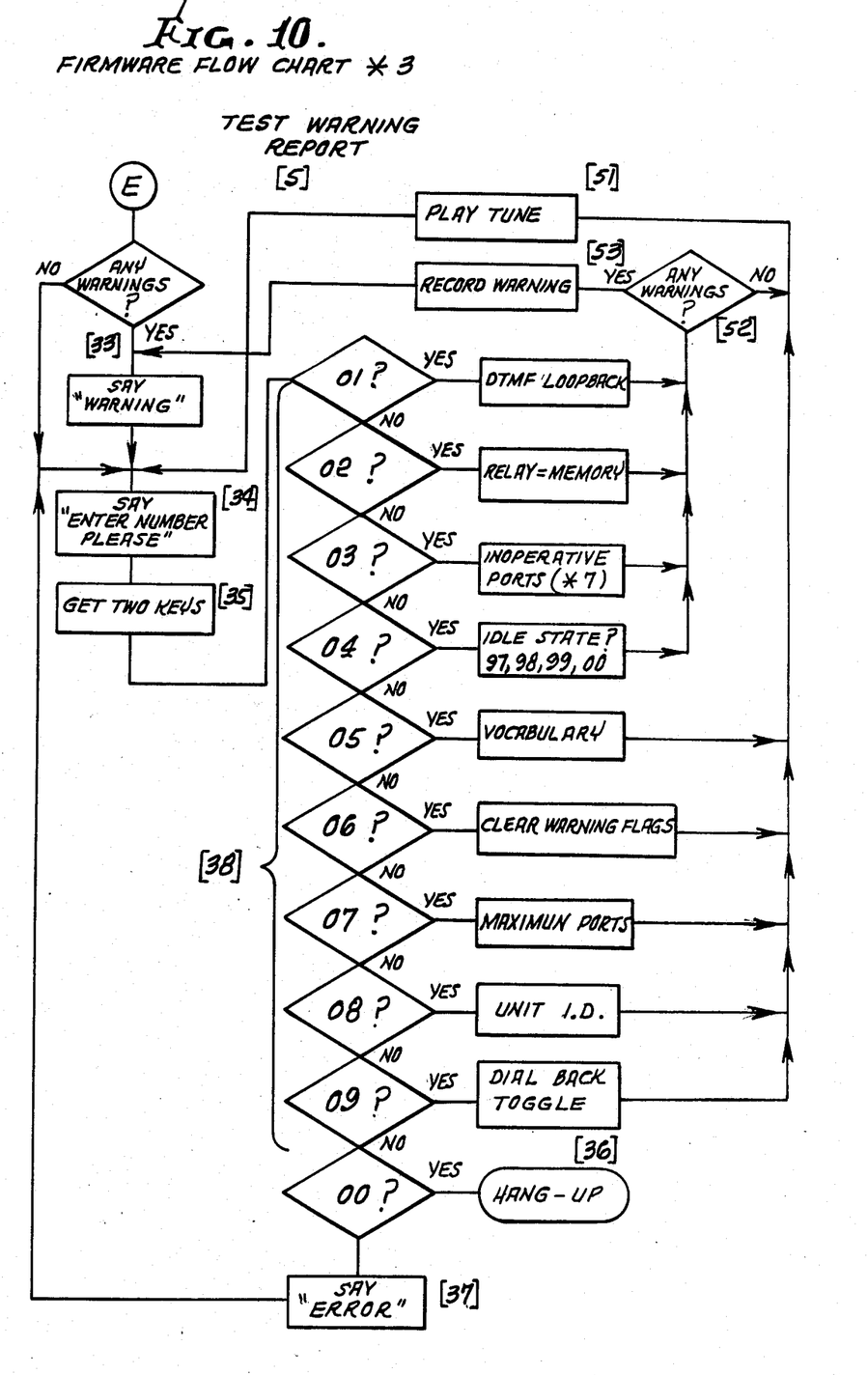

Once minimum security is entered [13], if an *3 is received [15] the SSCU CPU will enter the Test/Warning Report routine. Upon entering the routine, if any warning records exist (records of the system errors, not user errors) the SSCU will say "Warning!" [33].

If no warning records exist the SSCU will say "Enter number, please" [34]. The SSCU CPU will wait for a two digit test/report number from 01 to 09 [35]. If 00 is received the SSCU will go on-hook (hang up) [36] and return to the idle State [2]. If two digits greater than 09 are entered the SSCU will say "Error, enter number, please" [37]. If the test/report number is between 01 and 09 the SSCU will perform the corresponding test or report [38] (see SSCU practice for description of individual test/report routines).

After a test is successfully performed [52] or a report is given the SSCU CPU will play a three note tune then return to [34]. If a test is unsuccessfully performed [52] the SSCU CPU will record the warning [53], say "Warning!" [33] then return to [34].

Remote Bridge Maintenance [6]

Once minimum security is entered [13], if an *7 is received [16] the SSCU CPU will enter the Remote Bridge Maintenance routine. Upon entering the routine, the SSCU will say "Enter port number, please" [39]. If this is the first port number entry [40] the SSCU CPU will wait for a two digit port number from 01 to 96 [41]. If 00 is received the SSCU will go on-hook (hang up) [42] and return to the Idle State [2]. If the two digits exceed the maximum number of system ports (1 board=24, 2 boards=48, 3 boards=72, 4 boards=96) entered the SSCU will say "Error, enter port number, please" [27]. If the port number is between 01 and the maximum number of system ports, the SSCU will say "Port number XX is YY" [44] where XX is the port number entered and YY is the current state of that port, either terminated or connected. Then the SSCU CPU returns to the beginning of the routine [39].

After the first port number entry the SSCU CPU also looks for the * and the # in addition to new port numbers, If an * is received [45] the SSCU CPU terminates the currently selected port [46]. If an # is received [47] the SSCU CPU connects the currently selected port [48]. When the SSCU CPU performs a terminate or connect, it confirms the operation was successful [49] and if not records it as a warning [50]. Then the SSCU CPU goes to [44], reports the new state of the port and returns to the beginning of the routine [39].

Local Bridge Maintenance [7]

Whenever a terminate or connect button is pushed on a bridge board the SSCU CPU will then proceed to the Local Bridge Maintenance routine [7]. The SSCU CPU will first determine which board had a button pushed [54]. After isolating the board, the SSCU CPU will determine from the thumb-wheel switches whether to perform a memory/reply transfer (transfer the entire board relay state data between solid state and electromechanical memory) or a port change (terminate or connect selected port) [55].

If a memory/relay transfer is selected, the SSCU CPU will determine the direction of the transfer by which button was pushed [56]. If the terminate button was pushed the SSCU CPU will set all relays of the selected bridge board to the state recorded in solid state memory [57]. If the connect button was pushed the SSCU CPU will set the solid-state memory to the state of the relays of the selected bridge board [58].

If a port state change is selected, the SSCU CPU will determine whether to terminate or connect by which button was pushed [59]. If the terminate button was pushed the SSCU CPU will terminate the selected relay [60]. If the connect button was pushed the SSCU CPU will connect selected relay [61].

When the SSCU CPU performs either a memory/relay transfer or a port state change, it confirms the operation was successful [62] and flashes the TLI LED at 30 IPM (interruptions per minute) [65]. If the operation is unsuccessful the SSCU CPU records it as a warning [63] and flashes the LED on the TLI at 120 IPM (interruptions per minute) [64]. The the SSCU CPU returns to the beginning of the Idle State [2].

We claim:

1. In an apparatus for interconnecting a plurality of communication line pairs, the combination of:
   a resistance bridge having a plurality of pairs of bridge terminals to provide communication between subscribers spaced from each other;
   a terminating resistor;
   switch means for connecting a pair of bridge terminals to a comunication line pair and to said terminating resistor, with said bridge, resistor and switch means positioned at a communication equipment location remote from the subscriber; and
   control means for actuating said switch means from a remote location to selectively connect said bridge terminal pair to said communication line pair and to said terminating resistor, said control means including means for connecting a separate communications control line to said control means in controlling relation.

2. An apparatus as defined in claim 1 wherein said control means includes means for actuating said switch means to a. disconnect said communication line pair from and connect said terminating resistor to said bridge terminal pair,
b. disconnect said terminating resistor from and connect said communication line pair to said bridge terminal pair, and
c. disconnect another communication line pair from another bridge terminal pair and connect another terminating resistor to said other bridge terminal pair.

3. In an apparatus for interconnecting a plurality of communication line pairs, the combination of:
 a resistance bridge having a plurality of pairs of bridge terminals;
 a terminating resistor;
 switch means for connecting a pair of bridge terminals to a communication line pair and to said terminating resistor; and
 control means for actuating said switch means froma remote location to selectively connect said bridge terminal pair to said communication line pair and to said terminating resistor;
 said control means including means for actuating said switch means to
 a. disconnect said communication line pair from and connect said terminating resistor to said bridge terminal pair,
 b. disconnect said terminating resistor from and connect said communication line pair to said bridge terminal pair, and
 c. disconnect another communication line pair from another bridge terminal pair and connect another terminating resistor to said other bridge terminal pair; and
 means responsive to telephone tone multiple frequency signals of telephone touch pads for transmitting address codes identifying specific bridge terminal pairs and function codes identifying specific functions to be performed.

4. An apparatus as defined in claim 3 wherein said control means includes a speech synthesizer for converting apparatus status codes into audible speech for transmission to a remote telephone.

5. In an apparatus for interconnecting a plurality of communication line pairs, the combination of:
 a resistance bridge having a pair of bridge terminals for each of a plurality of communication line pairs to provide communication between subscribers spaced from each other;
 a terminating resistor for each of said pairs of bridge terminals;
 first switch means for connecting a pair of bridge terminals to a corresponding communication line pair and to a corresponding terminating resistor, with a first switch means for each terminating resistor, and with said bridge, resistors and switch means positioned at a communication equipment location remote from the subscribers; and
 control means for actuating each of said first switch means from a remote location to selectively connect a bridge terminal pair to a corresponding terminating resistor or to a corresponding communication line pair, said control means including means for connecting a separate communication control line to said control means in controlling relation.

6. In an apparatus for interconnecting a plurality of communication line pairs, the combination of:
 a resistance bridge having a pair of bridge terminals for each of a plurality of communication line pairs;
 a terminating resistor for each of said pairs of bridge terminals;
 first swtich means for connecting a pair of bridge terminals to a corresponding communication line pair and to a corresponding terminating resistor, with a first switch means for each terminating resistor;
 control means for actuating each of said first switch means from a remote location to selectively connect a bridge terminal pair to a corresponding terminating resistor or to a corresponding communication line pair;
 second manually operable switch means for manually selecting one of said first switch means; and
 third manually operable switch means for actuating a selected first switch means to connect a bridge terminal pair to a terminating resistor or to a communication line pair.

7. An apparatus as defined in claim 6 wherein each of said first switch means
 includes sensing means for indicating the state of the first switch means, and
 including memory means having the outputs of said sensing means as inputs for storing the state of each of said switch means.

8. An apparatus as defined in claim 7 including means for transmitting to a remote telephone, the stored states from said memory means.

9. An apparatus as defined in claim 8 wherein said control means includes means responsive to telephone tone multiple frequency signals of telephone touch pads for transmitting address codes identifying specific bridge terminals pairs and function codes identifying specific functions to be performed.

10. An apparatus as defined in claim 9 wherein said control means includes a speech synthesizer for converting the stored states into audible speech for transmission to a remote telephone.

* * * * *